No. 700,026. Patented May 13, 1902.
E. R. ELLSWORTH.
GAS METER.
(Application filed Feb. 4, 1902.)
(No Model.) 2 Sheets—Sheet 1.
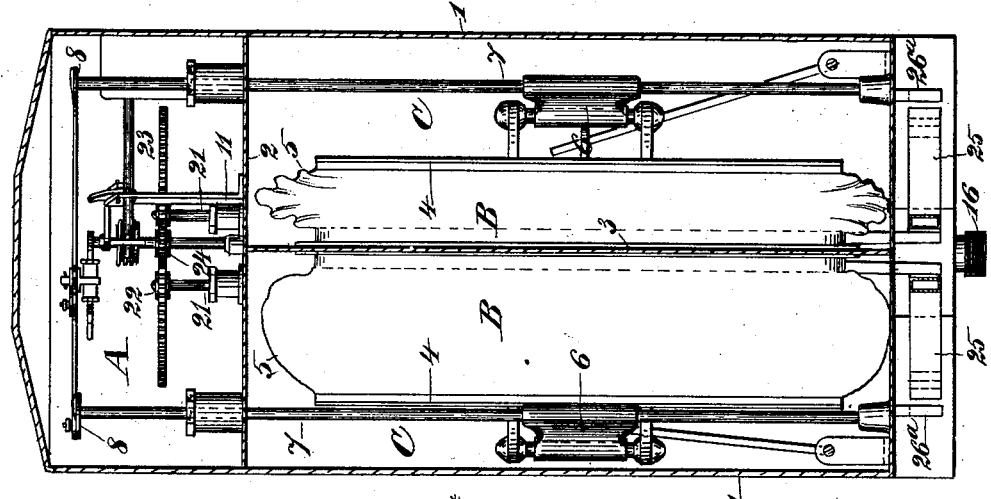
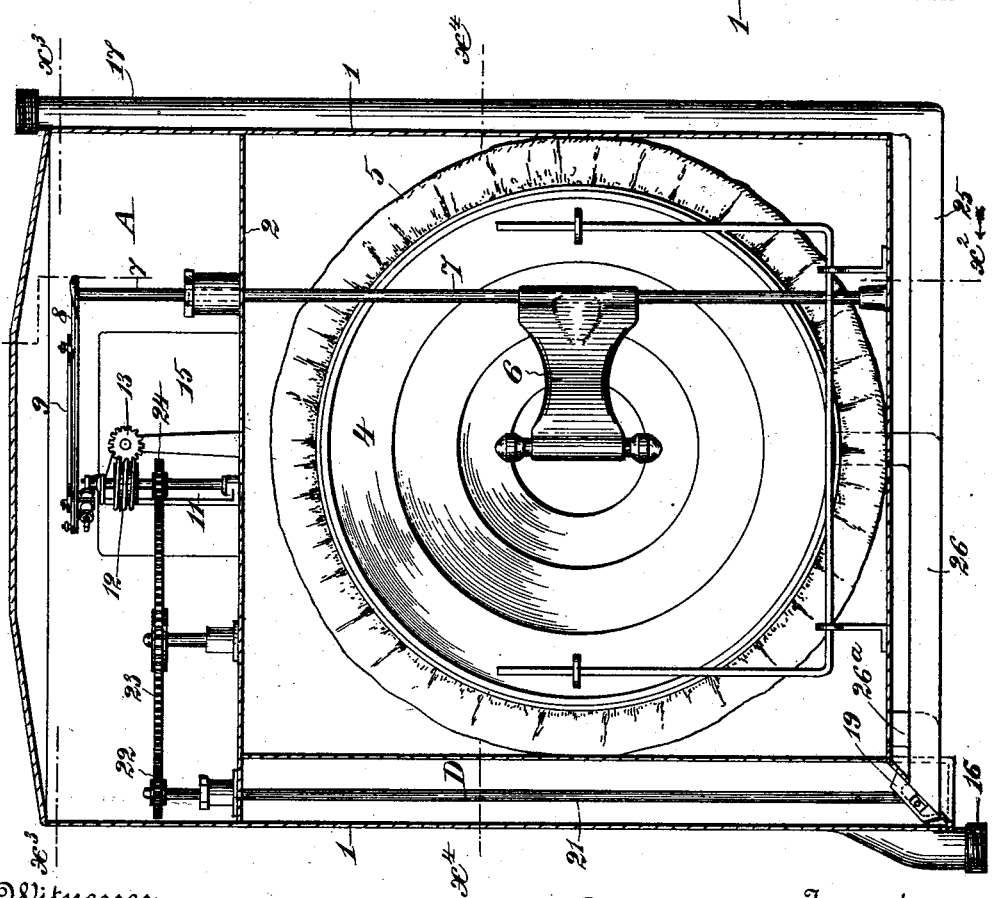
Witnesses
Inventor
Edwin R. Ellsworth
By his Attorney No. 700,026. Patented May 13, 1902.
E. R. ELLSWORTH.
GAS METER.
(Application filed Feb. 4, 1902.)
(No Model.) 2 Sheets—Sheet 2.
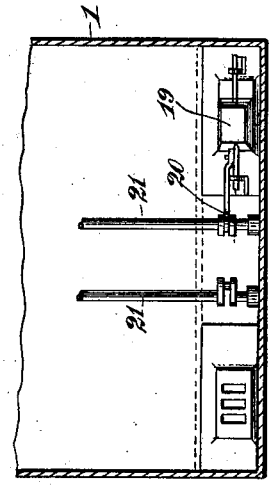
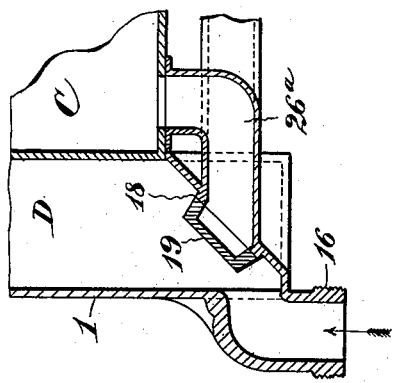
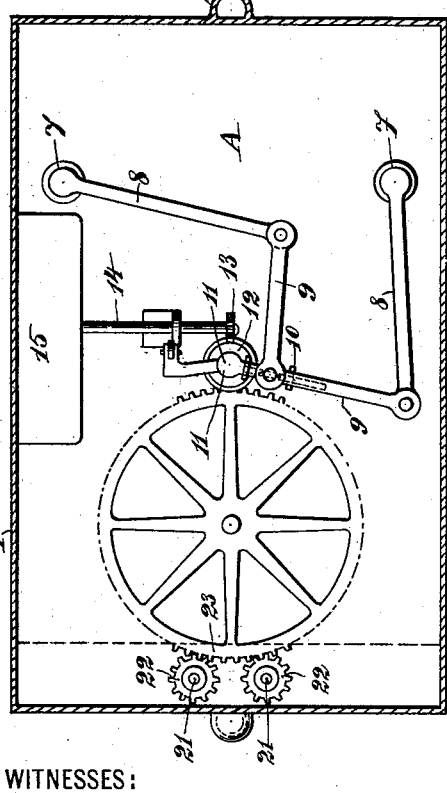
WITNESSES:
F. W. Wiman
Peter A. Ross
INVENTOR
Edwin R. Ellsworth
BY
Henry Connett
ATTORNEY

UNITED STATES PATENT OFFICE.

EDWIN R. ELLSWORTH, OF BROOKLYN, NEW YORK, ASSIGNOR OF ONE-FOURTH TO LOUIS A. STEDMAN, OF BROOKLYN, NEW YORK.

GAS-METER.

SPECIFICATION forming part of Letters Patent No. 700,026, dated May 13, 1902.

Application filed February 4, 1902. Serial No. 92,515. (No model.)

*To all whom it may concern:*

Be it known that I, EDWIN R. ELLSWORTH, a citizen of the United States, residing in the borough of Brooklyn, county of Kings, and city and State of New York, have invented certain new and useful Improvements in Gas-Meters, of which the following is a specification.

This invention relates to the class of meters for measuring gas consumed, but has nothing to do directly with the special measuring devices or means commonly found in such meters. Indeed, it is applicable to any of the known forms of meters.

The object of the invention is to provide a construction of the meter which will permit the water or other liquids of condensation from the gas in the pipes which serve a building to flow back through the meter and out to the main in the street, where it may be removed by the usual means employed for getting rid of products of condensation. As ordinarily constructed, so far as I am aware, the gas-meter serves as a trap to intercept the condensation from the house service-pipes, and this liquid, added to that arising from condensation in the meter itself, interferes in many ways, only too well known, with the proper supply of gas. When the liquids of condensation accumulate in the meter, it must be disconnected and emptied at considerable trouble and expense.

The meter which forms the object of the present application is so constructed that it permits, controls, and measures the flow of gas to the house service-pipes and at the same time permits the flow of all liquids from condensation back through the same conduits in the meter in a direction opposite to that of the flow of gas.

The leading and characteristic features of the invention are the continuous downward inclination of the gas-conduits of the meter from the outlet to the inlet and the arrangement of the controlling-valves and gas-distributing conduits below the level of the diaphragms and their chambers, so that all liquids from condensation will drain away from said chambers into the gas-inlet of the meter without forming a trap or seal at the valves.

In the accompanying drawings, which illustrate an embodiment of the present invention in a meter otherwise of a known construction, Figure 1 is a rear view of the meter with the back plate removed to show the interior. Fig. 2 is a vertical section substantially at line $x^2$ in Fig. 1. Fig. 3 is a horizontal sectional plan substantially at line $x^3$ in Fig. 1—that is to say, a plan with only the top plate removed. Fig. 4 is a horizontal section substantially at line $x^4$ in Fig. 1. Fig. 5 is a fragmentary side view illustrating the construction and arrangement of the valves and valve-seats seen in Fig. 4. Fig. 6 is an enlarged sectional detail view showing the relation of the gas-inlet to the controlling-valves.

1 designates the sheet-metal casing of a dry gas-meter, 2 a horizontal partition which parts off a chamber A above containing the gearing, and 3 a vertical partition dividing the main chamber of the casing below. 4 4 are the two diaphragms, and B C are the respective inner and outer diaphragm-chambers. The inner chambers are inclosed by the usual flexible fabric 5, each secured to a diaphragm and to a flange on the separating-partition 3. The respective diaphragms are coupled at their centers by arms 6 to upright rock-shafts 7, which extend up through packed bearings into the gearing-chamber A, where they are coupled by arms 8 and links 9 to a crank 10 on a crank-shaft 11. On this shaft is a worm 12 in gear with a pinion 13 on the shaft 14, which drives the gearing of the counter or meter proper, 15. All of this mechanism is well known in meters and will require no further description. In the ordinary meter the valves which control the flow of gas through the meter are simple slide-valves situated in a chamber within the chamber A, and the gas must flow up to this chamber and back again, as the valves are situated above the diaphragm-chambers.

In the present construction, 16 is the gas-inlet from the street-main, and 17 is the gas-outlet to the house service-pipe.

D is a gas and valve chamber formed at the side of the diaphragm-chambers and extending down below the bottom of said chambers. At the bottom of the chamber D are situated two inclined valve-seats 18, each having in it, as usual, two inlet-ports and an exhaust-port between them. On these valve-seats are set slide-valves 19. Each of these valves is coupled by a link 20 to a crank in an upright rotatable shaft 21, which extends up through the gas-chamber D and through packed bearings into the chamber A above, where it carries a pinion 22 in gear with an intermediate wheel 23, which latter is in gear at the opposite side with a pinion 24 on the crank-shaft 11. Thus rotation of the last-named shaft by the diaphragms imparts the proper reciprocating movement to the valves 19, and the latter control the flow of gas to and its exhaust from the diaphragm-chambers of the meter. The valve-seats are placed inclined, so that any liquid reaching the ports therein from the outlet of the meter will flow back through said ports into the bottom of the valve and gas chamber D and thence to the gas-inlet 16, which descends from the gas-chamber D, so as to carry away any liquid therefrom, and thus form a drainage-conduit leading to the street-main—that is to say, the ported valve-seat is so disposed as to be out of a horizontal plane, so that the ports therein will be lower at one side than the other.

From the intermediate exhaust-port of each valve-seat a conduit 25 leads to the gas-outlet 17, and from the respective inlet or outer ports in the valve-seat conduits 26 and 26ª lead to the respective inner and outer diaphragm-chambers B and C. These conduits are situated below the level of the diaphragm-chambers, and the valve-controlled ports are also situated below said level, so that while the gas may flow from the inlet 16 through the chambers of the meter and said conduits to the outlet 17 the liquid condensed in the house-pipes will flow from the outlet 17 back through the same conduits to the ports in the valve-seats, thence to the gas-chamber D, thence to the inlet 16, and thence to the street. It will be noted especially by reference to Fig. 6 that the ports in the valve-seat have their lower margins below the level of the axes of the conduits they control and above the level of the lower margin of the aperture through which the gas enters the gas-chamber. This construction effectually prevents the sealing and clogging up of the ports and passages in the meter with liquid and also provides for the carrying away of such liquid to a point where it may be conveniently removed without disturbing the meter.

Being the first, as I believe, to construct and place the conduits and valves of a gas-meter in such a manner that the liquids from condensation in the house service-pipes will flow back through the meter and by way of the same conduits and ports through which the gas flows in the opposite direction and without forming a liquid seal at the valves, I do not limit myself to the specific form, construction, and arrangement of these features, as herein shown, as they may be varied considerably without departing in any material degree from my invention. The conduits 25, 26, and 26ª must be disposed in such a manner as to cause all liquids from condensation to flow from the gas-outlet 17 to the gas-inlet 16. This inlet will be so arranged that the gas flows upward to the meter, and the outlet 17 will be so arranged that the gas flows upward on leaving the meter, so that all liquid drainage will flow back from the gas-outlet to the gas-inlet. The meter illustrated shows the usual double construction—that is, provided with two diaphragms and two controlling-valves—but as these are mere duplicates my invention is embodied in each of them.

I do not broadly claim disposing the controlling-valves at the bottom or lower part of the meter-casing, as this has been done, but so far as I am aware only in such a manner that they can be sealed by liquid collecting in the house service-pipe. In my construction no liquid can collect at the valves to seal them, for the reason that the valve-seat is in a plane at an angle to the horizon when the meter rests upon its base.

Having thus described my invention, I claim—

1. A gas-meter having a valve for controlling the flow of gas through the meter, a ported seat for the latter, said seat being set with its face out of a horizontal plane, and inlet and outlet gas-passages communicating with the ports in said seat, the inlet-aperture for the gas being disposed below the outlet-aperture for the gas, whereby the liquid of condensation will flow through the ports and by the valve from the outlet to the inlet without sealing the valve.

2. A gas-meter having a gas-chamber which extends below the diaphragm-chambers of the meter, valves at the lower part of said gas-chamber, ported valve-seats for said valves, said seats having their faces at an angle to a horizontal plane, an inlet for the gas opening into the gas-chamber below the level of the valve-controlled ports, and gas-outlets disposed above said ports in a manner to prevent the sealing of the valves by the accumulation of water of condensation about the same.

3. A gas-meter having its gas-inlet at a point below its diaphragm-chambers, a gas-chamber receiving gas from said inlet, inclined and ported valve-seats in said chamber and below the diaphragm-chambers, slide-valves on said seats, mechanism for operating said valves for controlling the flow of gas through the meter, and conduits leading from the ports in the valve-seats to the gas-outlet of the meter and to the respective diaphragm-chambers, said conduits being below the said chambers.

4. A gas-meter having a diaphragm and diaphragm-chambers for measuring the gas, a gas-chamber the bottom of which is below the bottom of the diaphragm-chambers, an inlet for gas to the gas-chamber, outlets for gas from said chamber, said outlets being disposed above the level of the inlet so that liquid may flow from the former down to the latter without sealing the passage from one to the other, a valve controlling said outlets, and mechanism between the valve and diaphragm whereby the latter actuates the former.

In witness whereof I have hereunto signed my name, this 3d day of February, 1902, in the presence of two subscribing witnesses.

EDWIN R. ELLSWORTH.

Witnesses:
 HENRY CONNETT,
 PETER A. ROSS.